(12) United States Patent
Takahashi et al.

(10) Patent No.: US 10,637,617 B2
(45) Date of Patent: Apr. 28, 2020

(54) USER APPARATUS, BASE STATION, AND COMMUNICATION METHOD

(71) Applicant: NTT DOCOMO, INC., Tokyo (JP)

(72) Inventors: Hideaki Takahashi, Tokyo (JP); Naoto Ookubo, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/757,464

(22) PCT Filed: Jul. 3, 2017

(86) PCT No.: PCT/JP2017/024318
§ 371 (c)(1),
(2) Date: Mar. 5, 2018

(87) PCT Pub. No.: WO2018/020959
PCT Pub. Date: Feb. 1, 2018

(65) Prior Publication Data
US 2018/0249366 A1 Aug. 30, 2018

(30) Foreign Application Priority Data

Jul. 29, 2016 (JP) ................................. 2016-150686

(51) Int. Cl.
*H04L 1/18* (2006.01)
(52) U.S. Cl.
CPC .................................. *H04L 1/1835* (2013.01)
(58) Field of Classification Search
CPC ........................... H04W 72/048; H04L 1/1835
See application file for complete search history.

(56) References Cited

U.S. PATENT DOCUMENTS

2012/0113840 A1* 5/2012 Le Pezennec ....... H04B 7/0417
370/252
2015/0296503 A1* 10/2015 Larsson .............. H04W 72/048
370/329

FOREIGN PATENT DOCUMENTS

WO 2015/178671 A1 11/2015

OTHER PUBLICATIONS

International Search Report of the International Searching Authority issued in PCT/JP2017/024318 dated Sep. 19, 2017 (5 pages).

(Continued)

*Primary Examiner* — Kevin C. Harper
(74) *Attorney, Agent, or Firm* — Osha Liang LLP (57) ABSTRACT

There is provided a user apparatus of a radio communication system provided with a base station and the user apparatus, the user apparatus including a determination unit configured to determine a size of a soft buffer to be secured within the user apparatus based on a total soft buffer size corresponding to a UE category of the user apparatus, a modulation scheme configured for a downlink by the base station, and a MIMO-layer number configured for the downlink by the base station; and a receiving unit configured to store data received from the base station in the soft buffer with the size determined by the determination unit, wherein the UE category includes 2 layers, 4 layers, and 8 layers as maximum MIMO-layer numbers to be supported, and the UE category includes 64 QAM and 256 QAM as the modulation schemes to be supported.

5 Claims, 8 Drawing Sheets

| UE DL Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| DL Category 18 | 1174752 -1206016 (Note 3) | 149776 (4 layers, 64QAM) 195816 (4 layers, 256QAM) 75376 (2 layers, 64QAM) 97896 (2 layers, 256QAM) 299856 (8 layers, 64QAM) 391656 (8 layers, 256QAM) | 14616576 | 2 or 4 or 8 |
| DL Category 19 | 1566336 -1658272 (Note 3) | 149776 (4 layers, 64QAM) 195816 (4 layers, 256QAM) 75376 (2 layers, 64QAM) 97896 (2 layers, 256QAM) 299856 (8 layers, 64QAM) 391656 (8 layers, 256QAM) | 19488768 | 2 or 4 or 8 |

(56) References Cited

OTHER PUBLICATIONS

Written Opinion of the International Searching Authority issued in PCT/JP2017/024318 dated Sep. 19, 2017 (4 pages).
Japanese Office Action in corresponding Patent Application No. 2015-150686 dated Sep. 19, 2017 (5 pages).
Huawei, et al.; "CR to 36.306 on new DL UE categories"; 3GPP TSG-RAN Meeting #67, RP-150458; Shanghai, China; Mar. 9-12, 2015 (7 pages).
Ericsson; "Remaining issues on UE category design"; 3GPP TSG RAN WG1 Meeting #78bis, R1-144270; Ljubljana, Slovenia; Oct. 6-10, 2014 (6 pages).
Huawei, et al.; "Discussion on UE category with introduction of 256QAM"; 3GPP TSG RAN WG1 Meeting #76, R1-140036; Prague, Czech Republic; Feb. 10-14, 2014 (3 pages).
Ericsson; "UE category solution for 256QAM support"; 3GPP TSG RAN WG1 Meeting #78, R1-143314; Dresden, Germany; Aug. 18-22, 2014 (19 pages).
Huawei, et al; "New UE DL categories for 1.2 Gbps and 1.6 Gbps for Rel-13"; 3GPP TSG-RAN Meeting #72, RP-161007; Busan, Korea; Jun. 13-16, 2016 (4 pages).
3GPP TS 36.306 V13.2.0; "3rd Generation Partnership Project; Technical Specification Group Radio Access Network; Evolved Universal Terrestrial Radio Access (E-UTRA); User Equipment (UE) radio access capabilities (Release 13)"; Jun. 2016 (61 pages).
3GPP TS 36.212 V13.2.0; "3rd Generation Partnership Project; Technical Specification Group Radio Access Network; Evolved Universal Terrestrial Radio Access (E-UTRA); Multiplexing and channel coding (Release 13)"; Jun. 2016 (140 pages).
3GPP TS 36.331 V13.2.0; "3rd Generation Partnership Project; Technical Specification Group Radio Access Network; Evolved Universal Terrestrial Radio Access (E-UTRA); Radio Resource Control (RRC); Protocol specification (Release 13)"; Jun. 2016 (623 pages).
3GPP TS 36.300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).
3GPP TS 36.213 V13.2.0; "3rd Generation Partnership Project; Technical Specification Group Radio Access Network; Evolved Universal Terrestrial Radio Access (E-UTRA); Physical layer procedures (Release 13)"; Jun. 2016 (381 pages).
3GPP TS 36.321 V13.2.0; "3rd Generation Partnership Project; Technical Specification Group Radio Access Network; Evolved Universal Terrestrial Radio Access (E-UTRA); Medium Access Control (MAC) protocol specification (Release 13)"; Jun. 2016 (91 pages).
Extended European Search Report issued in counterpart European Patent Application No. 17833968.5, dated Aug. 2, 2019 (10 Pages).

\* cited by examiner

FIG.1

Table 4.1A-1: Downlink physical layer parameter values set by the field *ue-CategoryDL*

| UE DL Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| DL Category M1 | 1000 | 1000 | 25344 | 1 |
| DL Category 0 (Note 2) | 1000 | 1000 | 25344 | 1 |
| DL Category 6 | 301504 | 149776 (4 layers, 64QAM) 75376 (2 layers, 64QAM) | 3654144 | 2 or 4 |
| DL Category 7 | 301504 | 149776 (4 layers, 64QAM) 75376 (2 layers, 64QAM) | 3654144 | 2 or 4 |
| DL Category 9 | 452256 | 149776 (4 layers, 64QAM) 75376 (2 layers, 64QAM) | 5481216 | 2 or 4 |
| DL Category 10 | 452256 | 149776 (4 layers, 64QAM) 75376 (2 layers, 64QAM) | 5481216 | 2 or 4 |
| DL Category 13 | 391632 | 195816 (4 layers, 256QAM) 97896 (2 layers, 256QAM) | 3654144 | 2 or 4 |
| DL Category 14 | 3916560 | 391656 (8 layers, 256QAM) | 47431680 | 8 |
| DL Category 15 | 749856-798800 (Note 3) | 149776 (4 layers, 64QAM) 195816 (4 layers, 256QAM) 75376 (2 layers, 64QAM) 97896 (2 layers, 256QAM) | 9744384 | 2 or 4 |
| DL Category 16 | 978960 -1051360 (Note 3) | 149776 (4 layers, 64QAM) 195816 (4 layers, 256QAM) 75376 (2 layers, 64QAM) 97896 (2 layers, 256QAM) | 12789504 | 2 or 4 |
| DL Category 17 | 25065984 | 391656 (8 layers, 256QAM) | 303562752 | 8 |

NOTE 1: In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.
NOTE 2: Within one TTI, a UE indicating category 0 shall be able to receive up to 1000 bits for a transport block associated with C-RNTI/Semi-Persistent Scheduling C-RNTI/P-RNTI/SI-RNTI/RA-RNTI and up to 2216 bits for another transport block associated with P-RNTI/SI-RNTI/RA-RNTI.
NOTE 3: The UE indicating category x shall reach the value within the defined range indicated by "Maximum number of DL-SCH transport block bits received within a TTI" of category x. The UE shall determine the required value within the defined range indicated by "Maximum number of DL-SCH transport block bits received within a TTI" of the corresponding category, based on its capabilities (i.e. CA band combination, MIMO, Modulation scheme). If the UE capability of CA band combination, MIMO and modulation scheme supported can exceed the upper limit of the defined range, the UE shall support the maximum value of the defined range indicated by "Maximum number of DL-SCH transport block bits received within a TTI" of the corresponding category.

FIG.2

|  | 64QAM | 256QAM |
|---|---|---|
| 2-LAYER MIMO | 1827072 | 2436096 |
| 4-LAYER MIMO | 3654144 | 4872192 |

| UE DL Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| DL Category 18 | 1174752 -1206016 (Note 3) | 149776 (4 layers, 64QAM) 195816 (4 layers, 256QAM) 75376 (2 layers, 64QAM) 97896 (2 layers, 256QAM) 299856 (8 layers, 64QAM) 391656 (8 layers, 256QAM) | 14616576 | 2 or 4 or 8 |
| DL Category 19 | 1566336 -1658272 (Note 3) | 149776 (4 layers, 64QAM) 195816 (4 layers, 256QAM) 75376 (2 layers, 64QAM) 97896 (2 layers, 256QAM) 299856 (8 layers, 64QAM) 391656 (8 layers, 256QAM) | 19488768 | 2 or 4 or 8 |

5.1.4.1.2 Bit collection, selection and transmission

If the UE signals *ue-CategoryDL-r12* indicating UE category 0, or if the UE signals *ue-CategoryDL-r12* indicating UE category 14 and is configured by higher layers with *altCQI-Table-r12* for the DL cell, $N_{soft}$ is the total number of soft channel bits according to the UE category indicated by *ue-CategoryDL-r12*. Otherwise, if the UE signals *ue-CategoryDL-v1330*, and is capable of supporting a maximum of 8 spatial layers for the DL cell in the transmission mode 9 or 10 configured for the UE, or if the configured maximum number of layers indicated by the *maxLayersMIMO-r10* field is 8, $N_{soft}$ is the total number of soft channel bits according to the UE category indicated by *ue-CategoryDL-v1330*. Otherwise, if the UE signals *ue-Category-v11a0*, and is configured by higher layers with *altCQI-Table-r12* for the DL cell, $N_{soft}$ is the total number of soft channel bits according to the UE category indicated by *ue-Category-v11a0*. Otherwise, if the UE signals *ue-Category-v1020*, and is configured with transmission mode 9 or transmission mode 10, or is configured with transmission mode 3 or transmission mode 4 and the higher layer parameter *maxLayersMIMO-r10* is configured to fourLayers, for the DL cell, $N_{soft}$ is the total number of soft channel bits [4] according to the UE category indicated by *ue-Category-v1020* [6]. Otherwise, $N_{soft}$ is the total number of soft channel bits [4] according to the UE category indicated by *ue-Category* (without suffix) [6].

If $N_{soft}$ = 35982720 or 47431680, $K_C$ = 5, elseif $N_{soft}$ = 14616576, if the UE is configured by higher layers with *altCQI-Table-r12*,         $K_C$ = 3/2 else

$K_C$ = 2 enf if, elseif $N_{soft}$ = 19488768, if the UE is configured by higher layers with *altCQI-Table-r12*,         $K_C$ = 2 else

$K_C$ = 8/3 enf if, elseif $N_{soft}$ = 7308288 and the UE is configured by higher layers with *altCQI-Table-r12*,     if the UE is capable of supporting no more than a maximum of two spatial layers for the DL cell in the transmission mode configured for the UE, or if the configured maximum number of layers indicated by the *maxLayersMIMO-r10* field is no more than two,         $K_C$ = 3 else

FIG.7

```
UE-EUTRA-Capability-v1330-IEs ::=    SEQUENCE {
    ue-CategoryDL-v1330                  INTEGER (18..19)
    OPTIONAL,
    nonCriticalExtension                 UE-EUTRA-Capability-v1270-IEs     OPTIONAL
}
```

5.1.4.1.2    Bit collection, selection and transmission

---

If the UE signals *ue-CategoryDL-r12* indicating UE category 0, or if the UE signals *ue-CategoryDL-r12* indicating UE category 14 and is configured by higher layers with *altCQI-Table-r12* for the DL cell, $N_{soft}$ is the total number of soft channel bits according to the UE category indicated by *ue-CategoryDL-r12*. Otherwise, if the UE signals *dl-Category18-r13*, and is capable of supporting a maximum of 8 spatial layers for the DL cell in the transmission mode 9 or 10 configured for the UE, or if the configured maximum number of layers indicated by the *maxLayersMIMO-r10* field is 8, $N_{soft}$ is the total number of soft channel bits according to the UE category indicated by *dl-Category18-r13*. Otherwise, if the UE signals *ue-Category-v11a0*, and is configured by higher layers with *altCQI-Table-r12* for the DL cell, $N_{soft}$ is the total number of soft channel bits according to the UE category indicated by *ue-Category-v11a0*. Otherwise, if the UE signals *ue-Category-v1020*, and is configured with transmission mode 9 or transmission mode 10, or is configured with transmission mode 3 or transmission mode 4 and the higher layer parameter *maxLayersMIMO-r10* is configured to fourLayers, for the DL cell, $N_{soft}$ is the total number of soft channel bits [4] according to the UE category indicated by *ue-Category-v1020* [6]. Otherwise, $N_{soft}$ is the total number of soft channel bits [4] according to the UE category indicated by *ue-Category* (without suffix) [6].

If $N_{soft}$ = 35982720 or 47431680, $K_C$ = 5, elseif $N_{soft}$ = 14616576, if the UE is configured by higher layers with *altCQI-Table-r12*, $K_C$ = 3/2 else $K_C$ = 2 enf if, elseif $N_{soft}$ = 7308288 and the UE is configured by higher layers with *altCQI-Table-r12*, if the UE is capable of supporting no more than a maximum of two spatial layers for the DL cell in the transmission mode configured for the UE, or if the configured maximum number of layers indicated by the *maxLayersMIMO-r10* field is no more than two, $K_C$ = 3 else $K_C$ = 3/2 end if, elseif $N_{soft}$ = 3654144 and the UE is capable of supporting no more than a maximum of two spatial layers for the DL cell, or if the configured maximum number of layers indicated by the *maxLayersMIMO-r10* field is no more than two, $K_C$ = 2

FIG.9

```
UE-EUTRA-Capability-v1330-IEs ::=    SEQUENCE {
    ue-CategoryDL-v1330 ::=    SEQUENCE {
        dl-Category18-r13        ENUMERATED {suppported}        OPTIONAL,
        dl-Category19-r13        ENUMERATED {suppported}        OPTIONAL
    }                                                            OPTIONAL,
    nonCriticalExtension         UE-EUTRA-Capability-v1270-IEs   OPTIONAL
}
```

FIG.12

USER APPARATUS, BASE STATION, AND COMMUNICATION METHOD

TECHNICAL FIELD

The present invention relates to a user apparatus, a base station, and a communication method.

BACKGROUND ART

In UMTS (Universal Mobile Telecommunications System) networks, Long Term Evolution (LTE) has been specified for the purpose of furthering high-rate data processing, low-latency, and the like. In addition, successor systems of LTE (e.g., LTE-A [LTE-Advanced], FRA [Future Radio Access], 4G, 5G, etc.,) further evolved from LTE have also been studied for the purpose of achieving wider bandwidths and higher rates.

User apparatuses in LTE are classified into multiple categories according to UE (User Equipment) capability. This category is called a "UE category". For example, a category 6 user apparatus defined in 3GPP Release 10 supports 300 Mbps and 51 Mbps, respectively, as a maximum bit rate (peak rate) of a DL (Downlink) and a maximum bit rate of UL (Uplink). Since 3GPP Release 12 and later, the UE category is defined separately for DL and UL. The UE category of DL is called "UE DL category", and the UE category of UL is called "UE UL category" (Non-Patent Document 1). The user apparatus UE is defined to report, when accessing, for example, a network, a UE category supported by the user apparatus UE itself to the base station via a predetermined signaling message (UE-EUTRA-Capability).

In LTE, Hybrid Automatic Repeat Request (HARQ) with soft combining is applied. In an HARQ process, when receiving error-containing data, the user apparatus accumulates data in a memory and combines the data with retransmission data to be retransmitted later. Note that the memory used for the HARQ process is called a "soft buffer". In addition, the base station also performs a data transmission process according to the size of the soft buffer in the user apparatus. Specifically, when performing DL (Downlink) data transmission, the base station performs a rate matching process based on the size of the soft buffer in the user apparatus.

RELATED-ART DOCUMENTS

Non-Patent Documents

[NON-PATENT DOCUMENT 1] 3GPP TS 36.306 V13.2.0 (2016-06)
[NON-PATENT DOCUMENT 2] 3GPP TS 36.212 V13.2.0 (2016-06)
[NON-PATENT DOCUMENT 3] 3GPP TS 36.331 V13.2.0 (2016-06)

SUMMARY OF THE INVENTION

Problem to be Solved by the Invention

At present, 3GPP proposes to define a new UE category that supports 1.2 Gbps and 1.6 Gbps as the maximum bit rate of DL. In the new UE category, it is desirable that the user apparatus supports up to 8-layer MIMO and supports up to 256 QAM as a modulation scheme.

Note that Non-Patent Document 2 defines that the size of the aforementioned soft buffer is determined according to the UE category, the number of MIMO layers configured for each of cells, and the modulation scheme configured for a corresponding one of the cells. However, according to the specifications of the current 3GPP, there is no specific method for determining the size of a soft buffer corresponding to 8 MIMO layers in order to specify a new UE category in a range higher than 1 Gbps (DL category 16) and less than 3 Gbps (category 8). In other words, according to the current 3GPP specification, when the eight-layer MIMO is applied, the user apparatus corresponding to the new UE category may not secure a soft buffer of a size required for the HARQ process. Further, since the base station may not properly perform a rate matching process, the base station and the user apparatus may not perform communications properly.

The disclosed technology is developed in view of the above-described problems, and an object is to provide a technology allowing a user apparatus to properly perform communications when a new UE category is added.

Means to Solve the Problem

A user apparatus according to a disclosed technology is a user apparatus of a radio communication system including a base station and the user apparatus, the user apparatus including a determination unit configured to determine a size of a soft buffer to be secured within the user apparatus based on a total soft buffer size corresponding to a UE category of the user apparatus, a modulation scheme configured for a downlink by the base station, and a MIMO-layer number configured for the downlink by the base station; and a receiving unit configured to store data received from the base station in the soft buffer with the size determined by the determination unit, wherein the UE category includes 2 layers, 4 layers, and 8 layers as maximum-MIMO layer numbers to be supported, and the UE category includes 64 QAM and 256 QAM as the modulation schemes to be supported.

Advantageous Effect of the Invention

According to the disclosed technology, there is provided a technology that allows a user apparatus to perform communications properly when a new UE category is added.

BRIEF DESCRIPTION OF THE DRAWINGS

FIG. 1 is a diagram illustrating a definition of a UE category in a usual LTE;
FIG. 6 is a diagram illustrating a modified specification example (Part 1) when determining Kc;
FIG. 8 is a diagram illustrating a modified specification example (Part 2) when determining Kc.

MODE FOR CARRYING OUT THE INVENTION

The following describes embodiments of the present invention with reference to the accompanying drawings. Note that the embodiments described below are merely examples and the embodiments to which the present invention is applied are not limited to the following embodiments. For example, it is assumed that a radio communication system according to an embodiment complies with LTE standards. However, the present invention may be applied not limited to LTE but also be applied to other systems. Note that, in the specification and the claims, the term "LTE" is used in a broad meaning that includes, not only a communication scheme corresponding to release 8 or 9 of the 3GPP, but also a communication scheme corresponding to release 10, 11, 12, or 13, or the fifth-generation mobile communication system corresponding to on or after release 14.

<DL Data Transmission Process and Soft Buffer Determination Method>

First, an illustration is given of a transmission process of DL data in LTE and a method for determining the size of a soft buffer. When transmitting the DL data, a base station eNB adds a 24-bit CRC (Cyclic Redundancy Check) to a transport block (TB: Transport Block). Subsequently, when the size of the transport block including the CRC exceeds 6144 bits, the base station eNB divides the transport block including the CRC into multiple code blocks (Code block segmentation), and adds a 24-bit CRC to each of the code blocks (Code block CRC attachment). The base station eNB then performs channel coding (Channel coding) for each code block to which the CRC is added. Channel coding is performed by turbo encoding with a coding rate of ⅓ to output coded bits with a bit length $K_W$. The encoded bits include systematic bits, first parity bits, and second parity bits, which are information bits for each code block.

Subsequently, the base station eNB individually performs an interleave process on the systematic bits, the first parity bits, and the second parity bits. The base station eNB first stores the systematic bits in a virtual circular buffer (virtual circular buffer), and subsequently stores the first parity bits and the second parity bits alternately (Bit collection). The size of the virtual circular buffer is the same as the above-mentioned $K_W$.

Subsequently, the base station eNB performs a rate matching process for each code block. Specifically, the base station eNB first determines a head position ($k_0$) for each retransmission version (RV: redundancy version) in the virtual circular buffer based on the soft buffer size for each code block. Next, the base station eNB takes, from the virtual circular buffer, bits corresponding to an output length (E) for each code block calculated based on the number of bits actually transmittable with 1 TB from the determined head position as a reference point.

Subsequently, the base station eNB concatenates each of bit sequences outputted by the rate matching process for each code block, performs scrambling, modulation processing, mapping to a resource block, and the like, and transmits the concatenated bit sequences to the user apparatus UE.

Subsequently, the user apparatus UE decodes the received data by performing an HARQ process. Specifically, when data for each received code block includes an error, the initial data and the retransmission data are stored in the soft buffer for each code block and combined to decode the received data.

A total soft buffer size (a total number of soft channel bits) that the user apparatus UE needs to have is fixedly defined for each UE category as illustrated in FIG. 1. FIG. 1 is an extracted section of UE categories among DL physical layer parameter sets for each UE category defined in Chapter 4.1 of Non-Patent Document 1.

The user apparatus UE secures a soft buffer for each cell. That is, the soft buffer of the total soft buffer size is divided into sizes determined for each cell using the following equation 2 (Eq. 2), thereby securing a soft buffer for each transport block within the user apparatus UE. Furthermore, the soft buffer for each transport block is divided into sizes determined using the following equation 1 (Eq. 1), thereby securing a soft buffer for each code block within the user apparatus UE.

The soft buffer size (Nob) for each code block is determined based on the following equation 1 (Eq. 1).

$$N_{cb} = \min\left(\left\lfloor \frac{N_{IR}}{C} \right\rfloor, K_w\right) \quad [\text{Eq. 1}]$$

In the equation 1 (Eq. 1), "$N_{IR}$" is a soft buffer size (bits) for each transport block in one cell, "C" is the number of code blocks, and "$K_W$" is a bit length of the encoded bits generated by turbo encoding. "$N_{IR}$" is determined based on the following equation 2 (Eq. 2).

$$N_{IR} = \left\lfloor \frac{N_{soft}}{K_C \cdot K_{MIMO} \cdot \min(M_{DL\_HARQ}, M_{limit})} \right\rfloor \quad [\text{Eq. 2}]$$

"$N_{SOFT}$" is a total soft buffer size (Total number of soft channel bits) described above. "$K_{MIMO}$" implies a maximum number of transport blocks that may be transmitted simultaneously in 1 TTI; "$K_{MIMO}=2$" when a PDSCH (Physical Downlink Shared Channel) is transmitted in a transmission mode (TM: Transmission mode) 3, 4, 8, 9, or 10, and "$K_{MIMO}=1$" for other cases. "$M_{DL\_HARQ}$" is the number of HARQ processes, which is specifically defined in Chapter 7 of TS 36.213. Basically, "$M_{DL\_HARQ}=8$" for FDD (Frequency Division Duplexing).

The value of "$K_C$" is defined in 5.1.4.1.2 of Non-Patent Document 2; and value of "$K_C$" is determined by the following procedure based on the value of "$N_{SOFT}$", a maximum number of MIMO layers, and a modulation scheme with the highest modulation level. In the following description, a modulation scheme with the highest modulation level is referred to as a "maximum modulation scheme" or the like for the purpose of convenience.

(Determination Method of Value "$K_C$")

(1) When the user apparatus UE reports "ue-Category DL-r12" indicating a UE category 0 as the UE capability (UE capability), or when the user apparatus UE reports "ue-Category DL-r12" indicating a UE category 14 as the UE capability (UE capability) and "altCQI-Table-r12" is configured as a radio configuration of a DL cell, a value of "$N_{SOFT}$" is determined as a total soft buffer size corresponding to the UE category reported by the "ue-Category DL-r12". When the above cases in (1) are not applicable, proceed to (2);

when the above cases in (1) are applicable, proceed to (A). Note that the case where "altCQI-Table-r12" is configured a a radio configuration of the DL cell is synonymous with a case where communication with the maximum modulation level of 256 QAM is performed in the DL cell (this also applies to the following description).

(2) When the user apparatus UE reports "ue-Category-v11a0" and "altCQI-Table-r12" is configured for the radio configuration of the DL cell, the value of "$N_{SOFT}$" is a total soft buffer size corresponding to the UE category reported by the "ue-Category-v11a0". When the above case in (2) is not applicable, proceed to (3), and when the above case in (2) is applicable, proceed to (A). According to Non-Patent Document 3, a UE category 11 or 12 may be configured in the "ue-Category-v11a0".

(3) In a case where the user apparatus UE reports "ue-Category-v1020" and where the transmission mode 9 or 10 is set; or in a case where the user apparatus UE reports "ue-Category-v 1020", the transmission mode 3 or 4 is set, and where 4 layers are set for "maxLayersMIMO-r10" as the radio setting of the DL cell; the value of "$N_{SOFT}$" is a total soft buffer size corresponding to the UE category reported by the "ue-Category-v1020". When the above cases in (3) are not applicable, proceed to (4), and when the above cases in (3) are applicable, proceed to (A). According to Non-Patent Document 3, UE categories 6 to 8 may be set in the "ue-Category-v1020".

(4) In a case where none of the above (1) to (3) are applicable, the value of "$N_{SOFT}$" is set to a total soft buffer size corresponding to the UE category reported by the "ue-Category", and subsequently, proceed to (A). According to Non-Patent Document 3, UE categories 1 to 5 may be set in the "ue-Category".

(A) When the value of "$N_{SOFT}$" is 35982720 or 47431680, "$K_C$"=5. If (A) is not applicable, proceed to (B).

(B) When the value of "$N_{SOFT}$" is 7308288 and "altCQI-Table-r12" is configured for the radio configuration of the DL cell, "$K_C$"=3 or 3/2. More specifically, when the user apparatus UE supports a maximum of 2 layers in the DL cell in the transmission mode set for the user apparatus UE, or when two layers are configured in "maxLayersMIMO-r10" for the radio configuration of the DL cell, "$K_C$"=3, otherwise "$K_C$"=3/2. If (B) is not applicable, proceed to (C).

(C) When the value of "$N_{SOFT}$" is 3654144 and the user apparatus UE supports the maximum of 2 layers in the DL cell, or when two layers are configured in "maxLayersMIMO-r10" as the radio configuration of the DL cell, "$K_C$"=2. If (C) is not applicable, proceed to (D).

(D) If none of the above-described (A) through (C) are applicable, "$K_C$"=1.

The above-described (1) through (4) indicate that the total soft buffer size corresponding to the UE category of the user apparatus UE is not used as the value of "$N_{SOFT}$" as it is. Note that Chapter 4.1 and Table 4.1 A-6 of Non-Patent Document 3 define that, in order to maintain backward compatibility, the user apparatus UE is required to report lower UE categories in addition to the UE category supported by the user apparatus UE itself. As an example, it is defined that the user apparatus UE supporting the UE category 6 or 7 is also required to report a UE category 4 in addition to the corresponding UE category 6 or 7. Further, as an example, it is defined that the user apparatus UE supporting a combination of a UE DL category 16 and a UE UL category 13 is required to report, in addition to a combination of the UE DL category 16 and the UE UL 13, UE categories 12, 10, 7, 4, and a combination of a UE DL category 12 and a UEUL category 13. That is, the above-described (1) through (4) are defined so as to satisfy at least one UE category among the UE category corresponding to the user apparatus UE and the UE categories lower than the UE category corresponding to the user apparatus UE.

Figure 2:
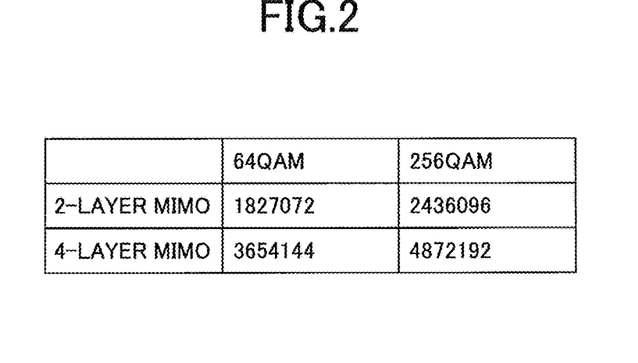
FIG. 2 is a diagram illustrating a calculation example of "$N_{IR}$"

Note that, for the purpose of simplicity, when "$N_{IR}$" is calculated on the basis of the assumption of "$K_{MIMO}=1$" and "MDL_HARQ=1" for UE categories of the UE category 4 or higher, in accordance with the above (1) to (4) and (A) to (D), the value of "$N_{IR}$" converges to any one of the values illustrated in FIG. 2, except for the UE category 8 and UE DL categories 14 and 17. For example, in FIG. 2, "$N_{IR}=1827072$" indicates a value of "$N_{IR}$" that is applied when a communication is performed using MIMO up to 2-layer MIMO (i.e., 1 layer or 2 layers) and QAM up to 64 QAM (i.e., QPSK, 16 QAM, or 64 QAM) in a DL cell.

Note that the UE category 8 is a special UE category for achieving 3 Gbps as the DL maximum bit rate by making it mandatory to support 64 QAN and 8-layer MIMO. Likewise, UE DL categories 14 and 17 are special UE categories for achieving 4 Gbps and 25 Gbps, respectively, as maximum bit rates of DL, by making it mandatory to support 256 QAM and 8 layer MIMO.

The DL data transmission process and the method for determining the soft buffer size in the LTE are described above; however, as illustrated in FIG. 2, in the current LTE, except for UE categories 8, 14 and 17, there is no method for determining the value of "$N_{IR}$", which is to be applied when a communication using up to 8 layers and up to 64 QAM, and when a communication using up to 8 layers and up to 256 QAM are performed in the DL cell. That is, according to the current LTE definitions, no method is defined for determining the value of "$N_{IR}$" that is applied when a communication using up to 8 layers and up to 64 QAM is performed, and when a communication using up to 8 layers and up to 256 QAM are performed with respect to a new UE category defined in a range where a DL maximum bit rate is higher than 1 Gbps (DL UE category 16) and lower than 3 Gbps (UE category 8).

Note that it might be considered that the method for determining "$N_{IR}$" for the UE category 8 and UE DL categories 14 and 17 might be applied as a method for determining "$N_{IR}$" for a new UE category. Specifically, it might be considered that the user apparatus UE supporting a new UE category might report a UE category 8 and UE DL categories 14 and 17 as lower UE categories. However, these UE categories are categories for achieving 3 Gbps or higher as a DL maximum bit rate and thus may not be appropriate for serving as lower categories for a new UE category that supports 1.2 Gbps and 1.6 Gbps as maximum bit rates of DL. Thus, it is not appropriate to apply the method for determining "$N_{IR}$" corresponding to the aforementioned UE categories to the user apparatus UE of the new UE category.

In the present embodiment, in particular, by newly defining, for a new UE category supporting 1.2 Gbps and 1.6 Gbps as the maximum DL bit rates, a method for determining the value of "$N_{IR}$" to be applied for executing communication using up to 8 layers and up to 64 QAM and for executing communication using up to 8 layers and up to 256 QAM in a DL cell, a user apparatus UE with the new UE category is allowed to communicate properly.

<System Configuration>

Figure 3:
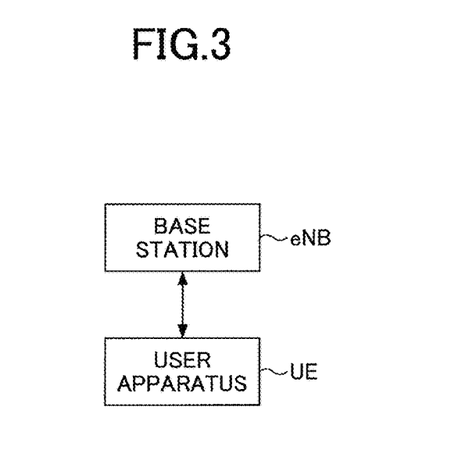
FIG. 3 is a diagram illustrating a configuration example of a radio communication system according to an embodiment.

FIG. 3 is a diagram illustrating a configuration example of a radio communication system according to an embodiment. As illustrated in FIG. 3, the radio communication system according to the embodiment has a base station eNB and a user apparatus UE. The user apparatus UE and the base station eNB are capable of performing CA (Carrier aggregation). Further, the CA includes DC (Dual Connectivity). FIG. 3 illustrates one user apparatus UE and one base station eNB each; however, this configuration of the radio communication system is merely an example. The configuration may include two or more user apparatuses UE and base stations eNB.

The user apparatus UE is configured to support the above-described new UE category. Among new UE categories, a UE DL category with a DL maximum bit rate of 1.2 Gbps may be referred to as a "UE DL category 18". Further, a UE DL category with a DL maximum bit rate of 1.6 Gbps may be referred to as a "UE DL category 19". In the following, for convenience, a description is given by using the terms of UE DL category 18 and UE DL category 19; however, the terms are not limited to these examples.

<Process Flow>

Figure 4:
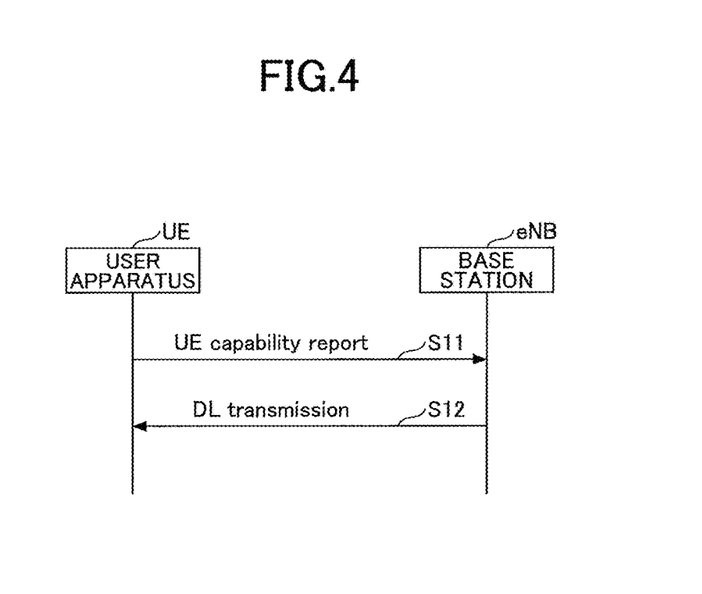
FIG. 4 is a sequence diagram in a DL communication.

A process flow performed by the radio communication system according to the embodiment will be described with reference to FIG. 4. First, when receiving the UE capability inquiry (UECapabilityEnforce) from the base station eNB, the user apparatus UE reports the UE capability report (UECapabilityInformation) to the base station eNB (S11). The UE capability report (UECapabilityInformation) includes a UE DL category (UE DL category 18 or 19) supported by the user apparatus UE.

Subsequently, the base station eNB calculates the size ($N_{cb}$) of the soft buffer for each code block of the user apparatus UE, and performs DL data transmission while performing rate matching based on the calculated size (S12). During calculation of the size ($N_{cb}$) of the soft buffer, when the base station eNB receives the UE DL category 18 or 19 from the user apparatus UE and communications using up to 8 layer are performed in the DL cell, the value of "$N_{SOFT}$" is defined to be a total soft buffer size corresponding to UE DL category 18 or 19. Further, the base station eNB determines the value of "$K_C$" based on the total soft buffer size corresponding to the UE DL category 18 or 19, and calculates the sizes of the soft buffers ($N_{IR}$, $N_{cb}$) using the above-described equations 1 and 2. A method for determining the value of "$K_C$" is described below.

Subsequently, the user apparatus UE recognizes communication parameters (the maximum MIMO-layer number and the maximum modulation scheme) in the DL cell by the RRC message (RRCConnection Setup, RRCConnection Reconfiguration, etc.) reported from the base station eNB, and calculates the sizes ($N_{IR}$, $N_{cb}$) of the soft buffers by using the value of "$N_{SOFT}$" corresponding to the UE DL category 18 or 19 supported by the user apparatus UE itself and the above-described equations 1 and 2. That is, the user apparatus UE determines the value of "$K_C$" using the determination method that is the same as that of the base station eNB, and calculates the sizes ($N_{IR}$, $N_{cb}$) of the soft buffers. Subsequently, the user apparatus UE configures the soft buffers with the calculated sizes in the memory and performs an HARQ process to decode the received data. Specifically, when data for each received code block includes an error, an attempt is made to decode the received data by combining the data for the first time and the retransmitted data stored in the soft buffer for each code block.

(Determination Method of Value "$K_C$" According to Embodiment)

Figure 5:
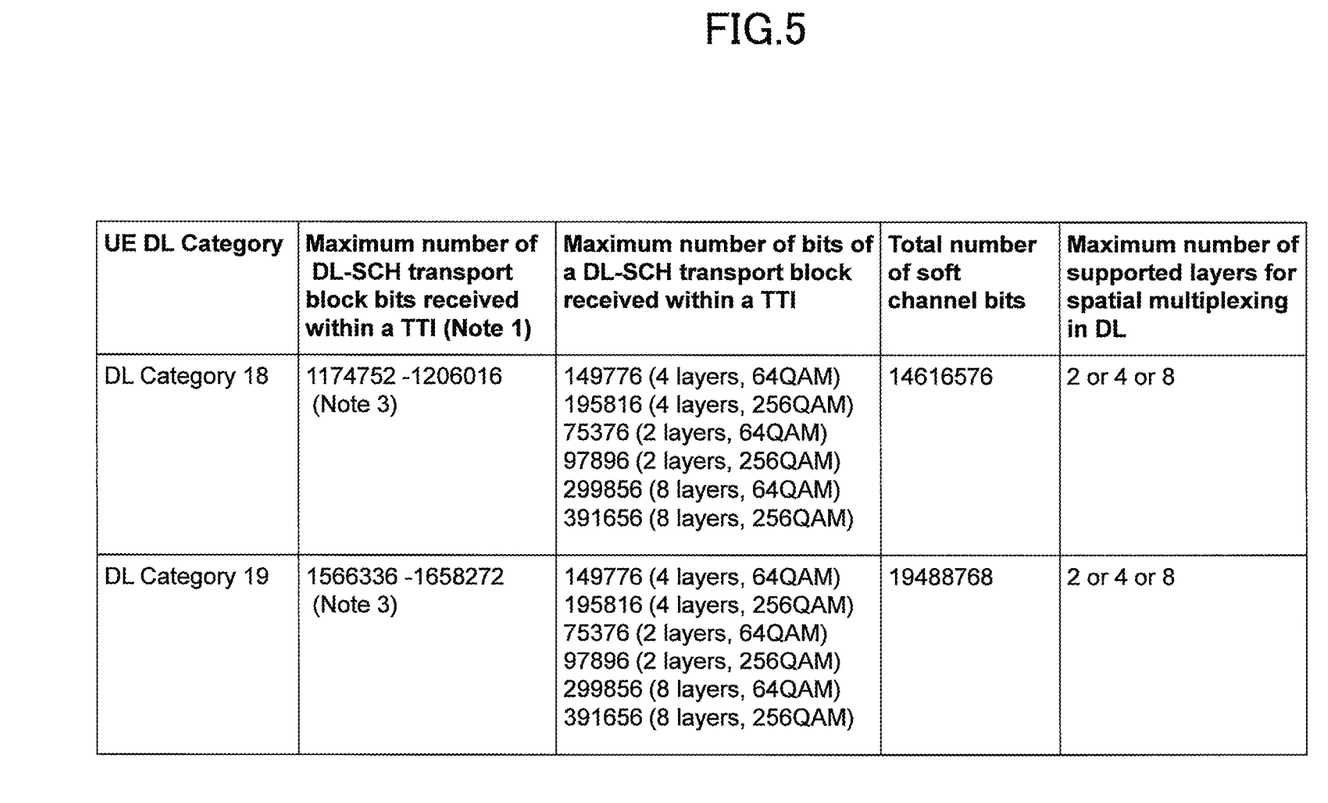
FIG. 5 is a diagram illustrating a definition example of a new UE category according to the embodiment.

Subsequently, the method for determining the value of "$K_C$" in the present embodiment is described in more detail. The present embodiment newly defines an information element (IE: Information element) of the RRC layer for reporting the UE DL categories 18 and 19. In the present embodiment, parameters illustrated in FIG. 5 are defined as DL physical layer parameters of the UE DL categories 18 and 19. The total soft buffer size corresponding to the UE DL category 18 is 14616576, which is 8 times a total soft buffer size (1827072) corresponding to a UE category 4 with a DL maximum bit rate of 150 Mbps (1.2 Gbps/150 Mbps=8). Further, the total soft buffer size corresponding to the UE DL category 19 is 19488768, which is 8/3 times a total soft buffer size (7308288) corresponding to a UE category 11 with a DL maximum bit rate of 600 Mbps (1.6 Gbps/600 Mbps=8/3).

As illustrated in FIG. 5, the user apparatuses of the UE DL categories 18 and 19 support either 2, 4, or 8 layers as a maximum MIMO-layer numbers; and up to 64 QAM (i.e., QPSK, 16 QAM and 64 QAM) or up to 256 QAM (i.e., QPSK, 16 QAM, 64 QAM and 256 QAM) as modulation schemes. In other words, the UE DL categories 18 and 19 may be defined as UE categories including 2 layers, 4 layers, and 8 layers as maximum MIMO-layer numbers to be supported and 64 QAM and 256 QAM as modulation schemes to be supported.

In the present embodiment, one of the following two methods may be used as a method for determining the value of "$K_C$".

[(Determination Method of Value of "$K_C$" (Part 1)]

In the determination method (part 1) of the value "$K_C$" [Part 1], the user apparatus UE corresponding to the UE DL category 19 reports the UE DL category 19 and the user apparatus UE corresponding to the UE DL category 18 reports the UE DL category 18.

In the determination method (part 1) of the value "$K_C$" [Part 1], among the processes (1) to (4) described in the above (DETERMINATION METHOD OF VALUE OF "$K_C$"), a following additional process ($1_a$) is added between processes (1) and (2), and when the process (1) is not applicable, proceed to the process ($1_a$). In addition, among the processes (A) to (D), the following processes ($A_1$) and ($A_2$) are added between (A) and (B), and when the process (A) is not applicable, proceed to the process ($A_1$).

($1_a$) When the user apparatus UE reports UE DL categories 18 and 19 and supports up to 8 MIMO layers in the DL cell in which a transmission mode 9 or 10 is configured for the user equipment UE, or when the user apparatus UE reports the UE DL categories 18 and 19 and 8 layers are configured for "maxLayersMIMO-r10" as a radio configuration of the DL cell, the value of "$N_{SOFT}$" is determined as a total soft buffer size corresponding to a UE category reported from the user apparatus UE. When the above process in ($1_a$) is not applicable, proceed to the process (2), and when the above process in ($1_a$) is applicable, proceed to the process (A). Note that a transmission mode 9 or 10 is a transmission mode in which up to 8 MIMO layers can be used.

($A_1$) When the value of "$N_{SOFT}$" is 14616576 (i.e., the UE DL category 18) and "altCQI-Table-r12" is configured as a radio configuration of the DL cell (i.e., when a communication with up to 256 QAM is performed in the DL cell), "$K_C$"=3/2. When the value of "$N_{SOFT}$" is 14616576 but "alt CQI-Table-r12" is not configured for the radio configuration of the DL cell (i.e., when communication with up to 64

QAM is performed in the DL cell), "$K_C$"=2. When ($A_1$) is not applicable, proceed to (A2).

($A_2$) When the value of "$N_{SOFT}$" is 19488768 (i.e., the UE DL category 19) and "altCQI-Table-r12" is configured as a radio configuration of the DL cell (i.e., when a communication with up to 256 QAM is performed in the DL cell), "$K_C$"=2. When the value of "$N_{SOFT}$" is 19488768 but "alt CQI-Table-r12" is not configured as the radio configuration of the DL cell (i.e., when communication with up to 64 QAM is performed in the DL cell), "$K_C$"=8/3. When the above is not applicable, proceed to (B).

Figure 7:
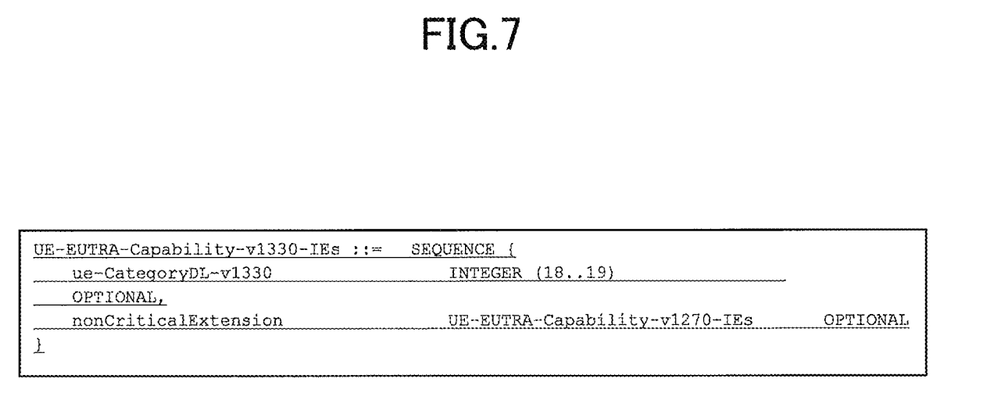
FIG. 7 is a diagram illustrating a modified specification example (Part 1) of UE-EUTRA-Capability.

FIG. 6 illustrates an example of a modified specification corresponding to a determination method (part 1) of a value "$K_C$" described above. The underlined part in FIG. 6 (see "Otherwise, if the UE signals ue-CategoryDL-v1330 The UE category indicated by ue-CategoryDL-v1330.") corresponds to the above ($1_a$). In addition, the underlined part in FIG. 6 (see "elseif $N_{soft}$=14616576, ..., $K_C$=2 ... enf if.") corresponds to the above ($A_1$), and the underlined part ("elseif $N_{soft}$=19488768, $K_C$=8/3 enf if.") corresponds to the above (A2). FIG. 7 illustrates an example of a modified specification of the UE capability report "UE-EUTRA-Capability-v1330" corresponding to the determination method (part 1) of the value "$K_C$". One of the UE DL categories 18 and 19 is configured for "ue-Category DL-v1330".

[Determination Method of Value "$K_C$" (Part 2)]

In the determination method (part 2) of value "$K_C$", unlike the determination method (part 1) of the value "$K_C$", the user apparatus UE corresponding to the UE DL category 19 also reports the UE DL category 18 as a lower level UE category.

In the determination method (part 2) of the value $K_C$", among the processes (1) to (4) described in the above (DETERMINATION METHOD OF VALUE OF "$K_C$"), a following additional process ($1_a$) is added between processes (1) and (2), and when the process (1) is not applicable, proceed to ($1_a$). In addition, among the processes (A) to (D), the following process ($A_1$) is added between (A) and (B), and when the process (A) is not applicable, proceed to ($A_1$).

($1_a$) When the user apparatus UE reports UE DL categories 18 and 19 and supports up to 8 MIMO-layer number in the DL cell in which a transmission mode 9 or 10 is configured for the user apparatus UE, or when the user apparatus UE reports the UE DL category 18 and 8 layers are configured for "maxLayersMIMO-r10" as a radio configuration of the DL cell, the value of "$N_{SOFT}$" is determined as a total soft buffer size corresponding to the UE category 18 reported from the user apparatus. When the above process in ($1_a$) is not applicable, proceed to (2), and when the above process in ($1_a$) is applicable, proceed to (A).

($A_1$) When the value of "$N_{SOFT}$" is 14616576 and "altCQI-Table-r12" is configured as the radio configuration of the DL cell (i.e., when a communication with up to 256 QAM is performed in the DL cell), "$K_C$"=3/2. When the value of "$N_{SOFT}$" is 14616576, and "alt CQI-Table-r12" is not configured as the radio configuration of the DL cell (i.e., when communication with up to 64 QAM is performed in the DL cell), "$K_C$"=2. When ($A_1$) is not applicable, proceed to (B).

Figure 9:
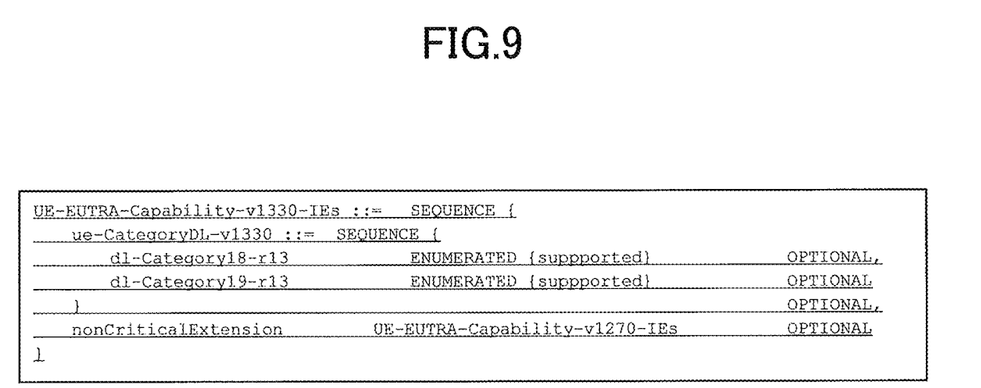
FIG. 9 is a diagram illustrating a modified specification example (Part 2) of UE-EUTRA-Capability.

FIG. 8 illustrates an example of a modified specification corresponding to a determination method (part 2) of a value of "$K_C$" described above. The underlined part in FIG. 8 (see "Otherwise, if the UE signals dl-Category18-r13 The UE category indicated by dl-Category18-r13.") corresponds to the above ($1_a$). Further, the underlined part in FIG. 8 (see "elseif $N_{soft}$=14616576, $K_C$=2 enf if.") corresponds to the above ($A_1$). FIG. 9 illustrates an example of a modified specification of the UE capability report "UE-EUTRA-Capability-v1330" corresponding to the determination method (part 2) of the value "$K_C$". "dl-Category 18-r13" indicates the UE DL category 18, and "dl-Category19-r13" indicates the UE DL category 19.

As described above, in the determination method (part 2) of the value "$K_C$", the process (A2) of the determination method (part 1) of the value "$K_C$" may be omitted. Hence, compared to the determination method (part 1), a calculation method of the value of "$K_C$" may be simplified.

[Supplementary Notes on Determination Methods (Part 1) and (Part 1)]

The user apparatus UE supporting a UE DL category 18 or 19 may also include a UE category 6 (or 7), 9 (or 10), and/or 11 (or 12) as a lower UE category. As a result, when the user apparatus UE supporting the UE DL category 18 or 19 does not perform a DL communication with up to 8 layers, the base station eNB and the user apparatus UE may determine the value of "$K_C$" using the processes (1) to (4) and (A) to (D) described above in (the determination method of the value "$K_C$").

The processes performed by the radio communication system in accordance with the embodiments are described above. Except for the UE category 8 and the UE DL categories 14 and 17 assuming the maximum bit rate that may be supported by the specification of 3GPP, the UE category (up to the DL category 16) that is widely used in the market at present merely supports up to 2 or 4 MIMO layers. In contrast, by using the radio communication system according to the embodiment, 8 layer-MIMO can be used for achieving a maximum bit rate such as 1.2 Gbps and 1.6 Gbps in the new UE category. Using the 8-layer MIMO and the 64 QAM modulation scheme, the present radio communication system may achieve a maximum bit rate of 600 Mbps with 1 carrier. That is, 1200 Mbps may be achieved by bundling two carriers by carrier aggregation. Similarly, using the 8-layer MIMO and the 256 QAM modulation scheme, the present radio communication system may achieve a maximum bit rate of 800 Mbps with 1 carrier. That is, 1600 Mbps may be achieved by bundling two carriers by carrier aggregation. For a UE category in usual LTE, only up to 2-layer MIMO or 4-layer MIMO is supported, so that it is necessary to bundle further more carriers for achieving the same maximum bit rate, as the maximum bit rate per one carrier is low.

The base station eNB is enabled to appropriately perform a rate matching process and the user apparatus UE is enabled to appropriately perform communications by applying the present embodiments when 8-layer MIMO is applied to the user apparatus UE of a new UE category capable of achieving a maximum bit rate such as 1.2 Gbps and 1.6 Gbps. Further, a communication carrier that employs the radio communication system according to the present embodiments may achieve the same maximum bit rate with a small frequency allocation (with a small number of carriers).

<Functional Configuration>

Figure 10:
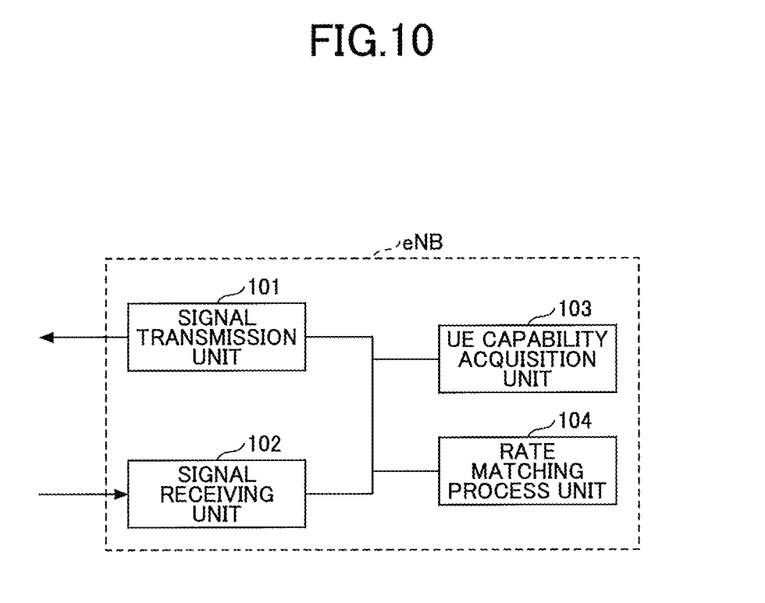
FIG. 10 is a diagram illustrating a functional configuration example of a base station according to an embodiment.

FIG. 10 is a diagram illustrating a functional configuration example of a base station according to the embodiment. As illustrated in FIG. 10, the base station eNB includes a signal transmission unit 101, a signal receiving unit 102, a UE capability acquisition unit 103, and a rate matching process unit 104. FIG. 10 illustrates merely main functional components of the base station eNB that includes not-illustrated functions at least for performing operations conforming to LTE. The functional configuration of the base station eNB illustrated in FIG. 10 is merely an example. Any functional division and any names of the functional components may be applied insofar as the operations according to the present embodiment may be executed.

The signal transmission unit includes a function to generate various types of signals of the physical layer from the signals of a higher layer to be transmitted from the base station eNB and to wirelessly transmit the generated signals. The signal receiving unit includes a function to receive various radio signals from the user apparatus UE and acquire signals of a higher layer based on the received signals of the physical layer. Further, the signal transmission unit includes a function to transmit, to the user apparatus UE, information bits on which rate matching has been performed by the rate matching process unit 104. Further, the signal transmission unit and the signal receiving unit each include a function to execute a CA that performs communication by bundling multiple CCs.

The UE capability acquisition unit includes a function to acquire a UE category of the user apparatus UE from the UE capability (UE-EUTRA-Capability) reported from the user apparatus UE and store the acquired UE category in a memory or the like.

The rate matching process unit includes a function to perform a rate matching process based on the size of soft buffer of the user apparatus UE, which is determined based on the UE category of the user apparatus UE, the modulation scheme configured for the downlink (a modulation scheme with a highest modulation level), the MIMO layer number configured for the downlink (the maximum MIMO-layer number). Note that the rate matching process unit may be included in the signal transmission unit 101.

(User Apparatus)

Figure 11:
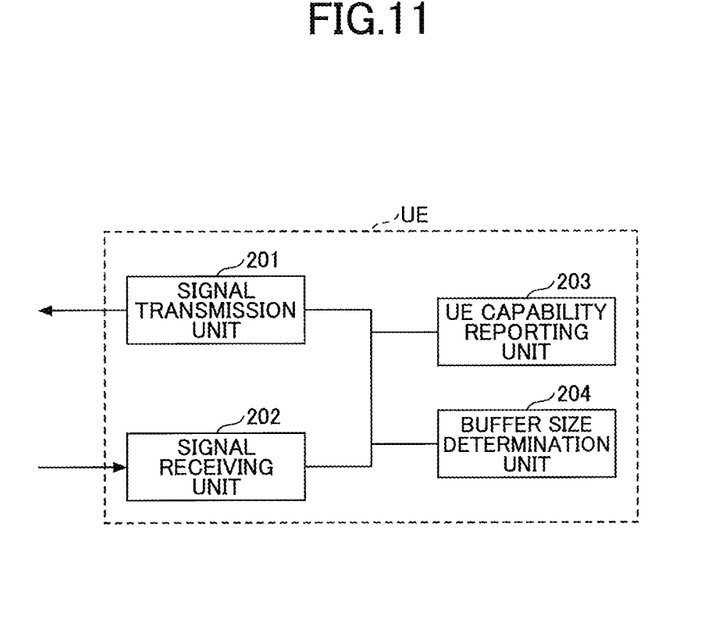
FIG. 11 is a diagram illustrating a functional configuration example of a user apparatus according to an embodiment.

FIG. 11 is a diagram illustrating a functional configuration example of a user apparatus according to an embodiment. As illustrated in FIG. 11, the user apparatus UE includes a signal transmission unit 201, a signal receiving unit 202, a UE capability reporting unit 203, and a buffer size determination unit 204. FIG. 11 merely illustrates the functional configuration particularly related to the embodiment of the present invention in the user apparatus UE, and the user apparatus UE may also include not-illustrated functions for performing at least operations conforming to LTE. The functional configuration of the user apparatus UE illustrated in FIG. 11 is merely an example. Any functional division and any names of the functional components may be applied insofar as the operations according to the present embodiment may be executed.

The signal transmission unit 201 includes a function to generate various types of signals of the physical layer from the signals of a higher layer to be transmitted from the user apparatus UE and to wirelessly transmit the generated signals. The signal receiving unit 202 includes a function to receive various radio signals from the base station eNB and acquire signals of a higher layer from the received signals of the physical layer. The signal transmission unit 201 and the signal receiving unit 202 each include a function to execute a CA that performs communication by bundling multiple CCs. Further, the signal receiving unit 202 has a function to store data received from the base station eNB in the soft buffer having a size determined by the buffer size determination unit 204 to perform a HARQ process with soft combining.

The UE capability reporting unit 203 includes a function to report the UE capability (UE-EUTRA-Capability) including the UE category of the user apparatus UE itself to the base station eNB.

The buffer size determination unit 204 has a function to determine a size of a soft buffer to be secured within the user apparatus UE based on a total soft buffer size ("$N_{SOFT}$") corresponding to a UE category of the user apparatus UE, a modulation scheme (a modulation scheme having a highest modulation level) configured for a downlink by the base station eNB, and a maximum MIMO-layer number to be configured for the downlink by the base station eNB (the maximum MIMO-layer number).

Note that, when the UE category of the user apparatus UE is the UE category 19, the buffer size determination unit 204 may determine the size of a soft buffer memory to be secured within the user apparatus UE based on the total soft buffer size corresponding to the UE category 19, and when the UE category of the user apparatus is UE category 18, the buffer size determination unit 204 may determine the size of the soft buffer to be secured within the user apparatus UE based on the total soft buffer size corresponding to the UE category 18.

Further, when the UE category of the user apparatus UE is the UE category 19 or the UE category 18, the buffer size determination unit 204 may calculate the size of the soft buffer to be secured within the user apparatus UE based on the total soft buffer size corresponding to the UE category 18.

<Hardware Configuration>

The block diagrams (FIGS. 10 and 11) used in the description of the above embodiments indicate blocks of functional units. These functional blocks (functional components) are implemented by any combination of hardware components or software components. The components for implementing respective functional blocks are not particularly specified. That is, the functional blocks may be implemented by one physically and/or logically combined device or may be implemented by two or more physically and/or logically separated devices that are directly and/or indirectly connected (e.g., wired and/or wireless connections).

Figure 12:
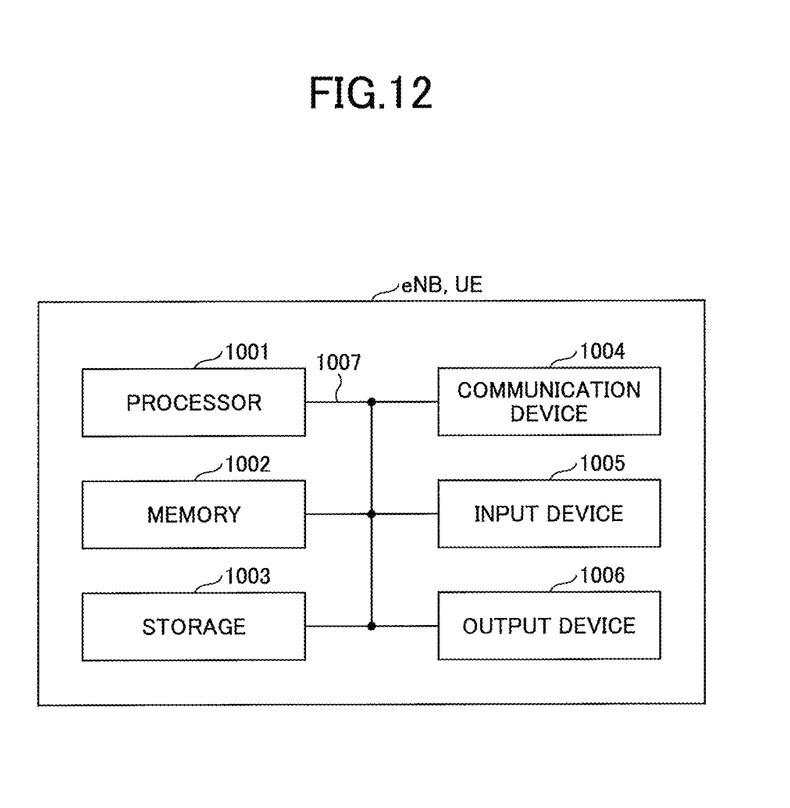
FIG. 12 is a diagram illustrating a hardware configuration example of the base station and the user apparatus according to an embodiment.

For example, the base station eNB and the user apparatus UE in an embodiment of the present invention may function as a computer that performs processes of a radio communication method according to the present invention. FIG. 12 is a diagram illustrating an example of a hardware configuration of the base station and the user apparatus according to an embodiment. The base station eNB and the user apparatus UE described above may each be physically configured as a computer device including a processor 1001, a memory 1002, a storage 1003, a communication device 1004, an input device 1005, an output device 1006, and a bus 1007.

In the following description, the term "device" may be replaced with a circuit, an apparatus, a unit, or the like. The hardware configuration of the base station eNB and the user apparatus UE may be configured to include one or more of the respective devices illustrated in FIG. 14 or may be configured without including some of the devices.

The functions of the base station eNB and the user apparatus UE may each be implemented by allowing predetermined software (programs) to be loaded on the hardware such as the processor 1001, the memory 1002, and the like so as to cause the processor 1001 to perform calculations to control communications by the communication device 1004, and reading and/or writing of data in the memory 1002 and the storage 1003.

The processor 1001 may, for example, operate an operating system to control the entire computer. The processor 1001 may be configured to include a central process unit (CPU) having an interface with peripherals, a control device, an operation device, and registers. For example, the signal transmission unit 101, the signal receiving unit 102, the UE capability acquisition unit 103, the rate matching process unit of the base station eNB, the signal transmission unit 201, the signal receiving unit 202, the UE capability reporting unit 203, and the buffer size determination unit 204 of the user apparatus UE may be implemented by the processor 1001.

In addition, the processor 1001 loads programs (program codes), software modules or data from the storage 1003 and/or the communication device 1004 into the memory 1002, and executes various processes according to the loaded programs, software modules or data. The programs are configured to cause a computer to execute at least a part of the operations described in the above embodiment. For example, the signal transmission unit 101, the signal receiving unit 102, the UE capability acquisition unit 103, the rate matching process unit of the base station eNB, the signal transmission unit 201 of the user apparatus UE, the signal receiving unit 202, the UE capability reporting unit 203, and the buffer size determination unit 204 may be implemented by a control program that is stored in the memory 1002 and that operates on the processor 1001; other functional blocks may be implemented in the same manner as described above. The above-described various processes described as being executed by one processor 1001; however, these processes may be executed simultaneously or sequentially by two or more processors 1001. The processor 1001 may be implemented by one or more chips. Note that the programs may be transmitted from the network via an electric communication line.

The memory 1002 may be a computer-readable recording medium formred of at least one of a ROM (Read Only Memory), an EPROM (Erasable Programmable ROM), an EEPROM (Electrically Erasable Programmable ROM), a RAM (Random Access Memory) and the like. The memory 1002 may be referred to as a register, a cache, a main memory (a main storage device), or the like. The memory 1002 may store executable programs (program codes), software modules, and the like for implementing a radio communication method according to the embodiment of the present invention.

The storage 1003 is a computer-readable recording medium composed, for example, of at least one of an optical disk such as a CD-ROM (Compact Disk ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, and a magnetic strip. The storage 1003 may be referred to as an auxiliary storage device. The above-described storage medium may be, for example, a database, a server, or another appropriate medium including the memory 1002 and/or the storage 1003.

The communication device 1004 is hardware (a transmitting-receiving device) for performing communications between computers via a wired and/or wireless network. The communication device 1004 may also be referred to as a network device, a network controller, a network card, a communication module, or the like. For example, the signal transmission unit and the signal receiving unit of the base station eNB, and the signal transmission unit 201 and the signal receiving unit 202 of the user apparatus UE may be implemented by the communication device 1004.

The input device 1005 is configured to receive an input from the outside. Examples of the input device include a keyboard, a mouse, a microphone, a switch, a button, and a sensor. The output device 1006 is configured to generate an output to the outside. Examples of the output device include a display, a speaker, and an LED lamp. Note that the input device 1005 and the output device 1006 may be integrated (e.g., a touch panel).

In addition, the respective devices such as the processor 1001 and the memory 1002 may be connected by a bus 1007 for mutually communicating information with one another. The bus 1007 may be formed of a single bus or may be formed of different buses between the devices.

Further, the base station eNB and the user apparatus UE may each include hardware such as a microprocessor, a digital signal processor (DSP), an ASIC (Application Specific Integrated Circuit), a PLD (Programmable Logic Device), and an FPGA (Field Programmable Gate Array). Alternatively, a part or all of the functional blocks of the base station eNB or the user apparatus UE may be implemented by the above-described hardware components. For example, the processor 1001 may be implemented with at least one of these hardware components.

<Conclusion>

As described above, according to the embodiment, there is provided a user apparatus of a radio communication system including a base station and the user apparatus, the user apparatus including a determination unit configured to determine a size of a soft buffer to be secured within the user apparatus based on a total soft buffer size corresponding to a UE category of the user apparatus, a modulation scheme configured for a downlink by the base station, and a MIMO-layer number configured for the downlink by the base station; and a receiving unit configured to store data received from the base station in the soft buffer with the size determined by the determination unit, wherein the UE category includes 2 layers, 4 layers, and 8 layers as maximum MIMO-layer numbers to be supported, and the UE category includes 64 QAM and 256 QAM as the modulation schemes to be supported. By the user apparatus UE, a technology is provided that allows the user equipment to appropriately execute communication when a new UE category is to be added.

Upon detecting that the UE category of the user equipment is a UE category 19, the determination unit may be configured to determine the size of the soft buffer based on the total soft buffer size corresponding to the UE category 19; and, upon detecting that the UE category of the user equipment is a UE category 18, the determination unit may be configured to determine the size of the soft buffer based on the total soft buffer size corresponding to the UE category 18. As a result, the user apparatus UE can determine the size of the soft buffer based on the total soft buffer size corresponding to each of the new UE categories.

Further, upon detecting that the UE category of the user apparatus is one of a UE category 19 and a UE category 18, the determination unit may be configured to calculate the size of the soft buffer based on the total soft buffer size corresponding to the UE category 18. As a result, the user apparatus UE can make the methods for calculating the size of the soft buffer to be common between the case where the UE category is 18 and the case where the UE category is 19.

Further, according to the embodiment, there is provided a base station of a radio communication system including the base station and a user apparatus, the base station including a processor configured to execute a rate matching process based on a size of a soft buffer of the user apparatus determined based on a UE category of the user apparatus, a modulation scheme configured for a downlink, and a maximum layer number configured for the downlink; and a transmission unit configured to transmit one or more rate-matched information bits to the user apparatus, wherein the UE category includes 2 layers, 4 layers, and 8 layers as maximum MIMO-layer numbers to be supported, and the UE category includes 64 QAM and 256 QAM as the modulation schemes to be supported. By the base station eNB, a technology is provided that allows the user apparatus to appropriately communicate when a new UE category is to be added.

Further, according to the embodiment, there is provided a radio communication method executed by a user apparatus of a radio communication system including a base station and the user apparatus, the radio communication method including determining a size of a soft buffer to be secured in the user apparatus based on a total soft buffer size corresponding to a UE category of the user apparatus, a modulation scheme configured for a downlink by the base station, and a MIMO-layer number configured for the downlink by the base station; and storing data received from the base station in the soft buffer with the determined size, wherein the UE category includes 2 layers, 4 layers, and 8 layers as maximum MIMO-layer numbers to be supported, and the UE category includes 64 QAM and 256 QAM as the modulation schemes to be supported. By the radio communication method, a technology is provided that allows the user apparatus to appropriately communicate when a new UE category is to be added.

Furthermore, according to the embodiment, there is provided a radio communication method executed by a base station of a radio communication system including the base station and a user apparatus, the radio communication method including executing a rate matching process based on a size of a soft buffer of the user apparatus determined based on a UE category of the user apparatus, a modulation scheme configured for a downlink, and a maximum layer number configured for the downlink; and transmitting one or more rate-matched information bits to the user apparatus, wherein the UE category includes 2 layers, 4 layers, and 8 layers as maximum MIMO-layer numbers to be supported, and the UE category includes 64 QAM and 256 QAM as the modulation schemes to be supported. By the radio communication method, a technology is provided that allows the user apparatus to appropriately communicate when a new UE category is to be added.

<Supplementary Description of Embodiment>

Each of aspects/embodiments described in the present specification may be applied to LTE (Long Term Evolution), LTE-A (LTE-Advanced), SUPER 3G, IMT-Advanced, 4G, 5G, FRA (Future Radio Access), W-CDMA, GSM (registered trademark), CDMA 2000, UMB (Ultra Mobile Broadband), IEEE 802.11 (Wi-Fi), IEEE 802.16 (WiMAX), IEEE 802.20, UWB (Ultra-Wide Band), Bluetooth, a scheme using other appropriate systems and/or a next generation scheme expanded based on these systems.

A base station may accommodate one or more (e.g., three) cells (also called sectors). When the base station accommodates multiple cells, the entire coverage area of the base station may be divided into multiple smaller areas; each of the smaller areas may also provide communication services by a base station subsystem (e.g., a small indoor base station RRH: Remote Radio Head). The term "cell" or "sector" refers to a part or all of the coverage area of a base station and/or a base station subsystem that performs communication service in this coverage. In addition, the terms "base station", "eNB", "cell" and "sector" may be used interchangeably herein. The base station may also be referred to as terms including a fixed station, a Node B, a eNode B (eNB), an access point, a femtocell, a small cell, and the like.

The user apparatus UE may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

The input/output information and the like may be stored in a specific location (e.g., a memory), or may be managed in a management table. Information to be input and output etc., may be overwritten, updated, or additionally written. The output information or the like may be deleted. The input information or the like may be transmitted to another device.

Each of aspects/embodiments described in the present specification may be used singly or in combination, or may be used by being switched according to the execution. In addition, notification of predetermined information (e.g., notification of "being X") is not limited to being performed explicitly; notification of predetermined information may also be performed implicitly (e.g., not notifying predetermined information).

It should be noted that the terms described in this specification and/or terms necessary for understanding the present specification may be replaced by terms having the same or similar meanings. For example, a component carrier (CC) may be referred to as a carrier frequency, a cell, or the like.

In addition, the information, parameters, and the like described in the present specification may be represented by an absolute value, may be expressed as a relative value based on a predetermined value, or may be represented by another corresponding information. For example, the radio resource may be indicated by an index.

The terms used for the above-described parameters shall not be, in any case, construed in a limited sense. In addition, mathematical expressions and the like using these parameters may be different from those explicitly disclosed in this specification. Since various channels (e.g., PUCCH, PDCCH) and information elements (e.g., TPC) may be identified by any suitable terms, the various terms assigned to these various channels and information elements shall not be, in any case, construed in a limited sense.

As used herein the term "determining" may encompass a wide variety of behaviors. The term "determining" may, for example, include meaning of judging, calculating, computing, processing, deriving, investigating, looking up (e.g., a search in a table, a database or a search with another data structure), and ascertaining "as determined", and the like. In addition, the term "determining" may include meaning of "receiving" (e.g., receiving information), transmitting (e.g., transmitting information), input, output, accessing (e.g., accessing data in memory), and the like. Furthermore, the term "determining" may include meaning of resolving, selecting, choosing, establishing, comparing, and the like. In other words, the term "determining" may include meaning of determining some action.

As used herein, the phrase "based on" does not mean "based only on" unless explicitly stated otherwise. In other words, the phrase "based on" means both "based only on" and "based on at least".

As long as the terms "including", "comprising", and variations thereof are used in the specification or claims, these terms are intended to be inclusive in a manner similar to the term "comprising". Furthermore, it is intended that the term "or" used in the specification or claims is not an "exclusive OR".

In the whole of the present disclosure, if articles are added by translation, such as a, an, and the like in English, these articles shall include plural ones unless the context clearly indicates otherwise.

Although the present invention has been described in detail above, it will be obvious to those skilled in the art that the present invention is not limited to the embodiments described in the present specification. The present invention may be implemented as modifications and alterations without departing from the spirit and scope of the present invention as defined by the scope of the claims. Accordingly, the description of the present specification is for the purpose of illustration and does not have any restrictive meaning to the present invention.

The present application is based on and claims the benefit of priority of Japanese Priority Application No. 2016-150686 filed on Jul. 29, 2016, the entire contents of Japanese Priority Application No. 2016-150686 are hereby incorporated herein by reference.

DESCRIPTION OF REFERENCE SIGNS

UE user apparatus
eNB base station
101 signal transmission unit
102 signal receiving unit
103 capability acquisition unit
104 rate matching process unit
201 signal transmission unit
202 signal receiving unit
203 UE capability reporting unit
204 buffer size determination unit
1001 processor
1002 memory
1003 storage
1004 communication device
1005 input device
1006 output device

The invention claimed is:

1. A user apparatus of a radio communication system including a base station and the user apparatus, the user apparatus comprising:
a processor configured to determine a size of a soft buffer to be secured within the user apparatus based on a total soft buffer size corresponding to a UE category of the user apparatus, a modulation scheme configured for a downlink by the base station, and a MIMO-layer number configured for the downlink by the base station; and
a receiver configured to store data received from the base station in the soft buffer with the size determined by the processor,
wherein the UE category includes 2 layers, 4 layers, and 8 layers as maximum MIMO-layer numbers to be supported, and the UE category includes 64 QAM and 256 QAM as the modulation schemes to be supported,
wherein, upon detecting that the UE category of the user apparatus is a UE category 19 for an LTE-based system, the processor is configured to calculate the size of the soft buffer based on the total soft buffer size corresponding to the UE category 18 for the LTE-based system or UE category 19 for the LTE-based system and
wherein, for the UE category 19 for the LTE-based system, a maximum number of downlink shared channel transport block bits received within a transmission time interval is within a range from 1566336 to 1658272.

2. The user apparatus according to claim 1,
wherein, upon detecting that the UE category of the user equipment is the UE category 19 for the LTE-based system, the processor is configured to determine the size of the soft buffer based on the total soft buffer size corresponding to the UE category 19 for the LTE-based system.

3. A base station of a radio communication system including the base station and a user apparatus, the base station comprising:
a processor configured to execute a rate matching process based on a size of a soft buffer of the user apparatus determined based on a UE category of the user apparatus, a modulation scheme configured for a downlink, and a maximum layer number configured for the downlink; and
a transmitter configured to transmit one or more rate-matched information bits to the user apparatus,
wherein the UE category includes 2 layers, 4 layers, and 8 layers as maximum MIMO-layer numbers to be supported, and the UE category includes 64 QAM and 256 QAM as the modulation schemes to be supported,
wherein, upon detecting that the UE category of the user apparatus is a UE category 19 for an LTE-based system, the processor is configured to calculate the size of the soft buffer based on the total soft buffer size corresponding to the UE category 18 for the LTE-based system or UE category 19 for the LTE-based system, and
wherein, for the UE category 19 for the LTE-based system, a maximum number of downlink shared channel transport block bits received within a transmission time interval is within a range from 1566336 to 1658272.

4. A radio communication method executed by a user apparatus of a radio communication system including a base station and the user apparatus, the radio communication method comprising:
determining a size of a soft buffer to be secured in the user apparatus based on a total soft buffer size corresponding to a UE category of the user apparatus, a modulation scheme configured for a downlink by the base station, and a MIMO-layer number configured for the downlink by the base station; and
storing data received from the base station in the soft buffer with the determined size,
wherein the UE category includes 2 layers, 4 layers, and 8 layers as maximum MIMO-layer numbers to be supported, and the UE category includes 64 QAM and 256 QAM as the modulation schemes to be supported,
wherein, upon detecting that the UE category of the user apparatus is a UE category 19 for an LTE-based system, the determining includes calculating the size of the soft buffer based on the total soft buffer size corresponding to the UE category 18 for the LTE-based system or UE category 19 for the LTE-based system, and
wherein, for the UE category 19 for the LTE-based system, a maximum number of downlink shared channel transport block bits received within a transmission time interval is within a range from 1566336 to 1658272.

5. A radio communication method executed by a base station of a radio communication system including the base station and a user apparatus, the radio communication method comprising:
executing a rate matching process based on a size of a soft buffer of the user apparatus determined based on a UE category of the user apparatus, a modulation scheme configured for a downlink, and a maximum layer number configured for the downlink; and transmitting one or more rate-matched information bits to the user apparatus, wherein the UE category includes 2 layers, 4 layers, and 8 layers as maximum MIMO-layer numbers to be supported, and the UE category includes 64 QAM and 256 QAM as the modulation schemes to be supported, wherein, upon detecting that the UE category of the user apparatus is a UE category 19 for an LTE-based system, the executing includes calculating the size of the soft buffer based on the total soft buffer size corresponding to the UE category 18 for an LTE-based system or UE category 19 for an LTE-based system, and wherein, for the UE category 19 for the LTE-based system, a maximum number of downlink shared channel transport block bits received within a transmission time interval is within a range from 1566336 to 1658272.

* * * * *